(12) United States Patent
Curlett et al.

(10) Patent No.: US 9,770,671 B2
(45) Date of Patent: Sep. 26, 2017

(54) SYSTEMS AND METHODS FOR CONCENTRATING WASTE WATER FLUIDS

(75) Inventors: Joshua Curlett, Calgary (CA); Samuel Curlett, Calgary (CA); Jesse Curlett, Calgary (CA); Harry Curlett, Calgary (CA)

(73) Assignee: Horizon Oilfield Solutions Inc., Calgary (CA)

( * ) Notice: Subject to any disclaimer, the term of this patent is extended or adjusted under 35 U.S.C. 154(b) by 878 days.

(21) Appl. No.: 13/420,314

(22) Filed: Mar. 14, 2012

(65) Prior Publication Data

US 2012/0247942 A1    Oct. 4, 2012

Related U.S. Application Data

(63) Continuation of application No. PCT/CA2010/001440, filed on Sep. 17, 2010.

(60) Provisional application No. 61/333,864, filed on May 12, 2010, provisional application No. 61/243,738, filed on Sep. 18, 2009.

(51) Int. Cl.
| | |
|---|---|
| *C02F 1/04* | (2006.01) |
| *B01D 1/14* | (2006.01) |
| *C02F 1/12* | (2006.01) |
| *B01D 1/16* | (2006.01) |

(52) U.S. Cl.
CPC ............ *B01D 1/14* (2013.01); *B01D 1/16* (2013.01); *C02F 1/048* (2013.01); *C02F 1/12* (2013.01)

(58) Field of Classification Search
None
See application file for complete search history.

(56) References Cited

U.S. PATENT DOCUMENTS

| | | | |
|---|---|---|---|
| 2,101,112 A | 12/1937 | Vicary | |
| 2,764,234 A * | 9/1956 | Rauh | 159/16.2 |
| 3,473,298 A | 10/1969 | Berman | |

(Continued)

FOREIGN PATENT DOCUMENTS

| | | |
|---|---|---|
| CA | 2531870 A1 | 7/2006 |
| CA | 2554471 A1 | 8/2007 |

(Continued)

OTHER PUBLICATIONS

International Search Report & Written Opinion of the International Searching Authority; Application No. PCT/CA2010/001440; Issued: Dec. 10, 2010; Mailing Date: Jan. 25, 2012; 12 pages.

(Continued)

*Primary Examiner* — Jonathan Miller
(74) *Attorney, Agent, or Firm* — Whitmyer IP Group LLC

(57) ABSTRACT

A method and apparatus for processing waste water generated during oilfield drilling operations with a mobile processing unit utilizing heat energy sourced from burning hydrocarbon fuel directly and/or capturing and using the exhaust heat energy generated by burning hydrocarbons in engines such as diesel engines in order to vaporize a dominant mass of the aqueous phase of the waste water while clarifying the heat source combustion gasses. The water vapor generated by the vaporization process may be discharged directly to the atmosphere or alternately condensed and captured for use as portable water. The residual waste water is thereby concentrated and the cost to dispose of the waste water is greatly reduced.

33 Claims, 8 Drawing Sheets

(56) References Cited

U.S. PATENT DOCUMENTS

| | | | |
|---|---|---|---|
| 4,808,319 A | 2/1989 | McNally et al. | |
| 5,207,869 A | 5/1993 | Harmoning et al. | |
| 5,259,931 A | 11/1993 | Fox | |
| 5,573,895 A | 11/1996 | Komatsu et al. | |
| 5,770,019 A | 6/1998 | Kurematsu et al. | |
| 6,200,428 B1 | 3/2001 | VanKouwenberg | |
| 6,887,344 B1* | 5/2005 | VanKouwenberg | 159/23 |
| 7,513,972 B2 | 4/2009 | Hart et al. | |
| 7,722,739 B2 | 5/2010 | Haslem et al. | |
| 2004/0261952 A1* | 12/2004 | Hart et al. | 159/47.3 |
| 2006/0000355 A1 | 1/2006 | Ogura et al. | |
| 2006/0194159 A1 | 8/2006 | Franz et al. | |
| 2006/0197238 A1* | 9/2006 | Forstmanis | 261/78.2 |
| 2007/0235146 A1* | 10/2007 | Haslem et al. | 159/47.3 |
| 2009/0199972 A1* | 8/2009 | Lakatos et al. | 159/3 |
| 2009/0294074 A1 | 12/2009 | Forstmanis | |
| 2009/0314005 A1* | 12/2009 | Messmer | F02F 1/4292 60/792 |
| 2011/0140457 A1* | 6/2011 | Lakatos et al. | 290/1 R |

FOREIGN PATENT DOCUMENTS

| | | |
|---|---|---|
| CN | 1205984 A | 1/1999 |
| CN | 1785825 A | 6/2006 |
| DE | 3311758 A1 | 10/1984 |
| EP | 1955755 A2 | 8/2008 |
| JP | 2004097866 A | 4/2004 |
| RU | 2041856 C1 | 8/1995 |
| SU | 808781 A1 | 2/1981 |
| SU | 1673202 A1 | 8/1991 |
| SU | 1680634 A1 | 9/1991 |
| WO | 2007108008 A2 | 9/2007 |
| WO | 2010139114 A1 | 12/2010 |

OTHER PUBLICATIONS

The State Intellectual Property Office of Peoples' Republic of China Second Office Action Application No. 201080050568.4 Issue Date: Apr. 17, 2014 pp. 5.

The State Intellectual Property Office of Peoples' Republic of China First Office Action Application No. 201080050568.4 Issue Date: Jul. 30, 2013 pp. 5.

The State Intellectual Property Office of Peoples' Republic of China Third Office Action Application No. 201080050568.4 Issue Date: Oct. 11, 2014 pp. 5.

Patents Act 1977 Examination Report under Section 18(3) Application No. GB1206424.2 Date of Report: Sep. 1, 2014 pp. 4.

Russian Office Action Application No. 2012115489 Date: Sep. 12, 2014 pp. 12.

* cited by examiner

SYSTEMS AND METHODS FOR CONCENTRATING WASTE WATER FLUIDS

CROSS-REFERENCE TO RELATED APPLICATIONS

The present application is a continuation of pending International Patent Application No. PCT/CA2010/001440, filed on Sep. 17, 2010, which claims the benefit under 35 U.S.C. §119 (e) of U.S. Provisional Patent Application No. 61/333,864, filed on May 12, 2010 and of U.S. Provisional Patent Application No. 61/234,738, filed on Sep. 18, 2009. The content of all prior applications is incorporated herein by reference.

FIELD OF THE INVENTION

The invention relates to a method and apparatus for processing waste water generated during oilfield drilling operations with a mobile processing unit utilizing heat energy sourced from burning hydrocarbon fuel directly and/or capturing and using the exhaust heat energy generated by burning hydrocarbons in engines such as diesel engines in order to vaporize a dominant mass of the aqueous phase of the waste water while clarifying the heat source combustion gasses. The water vapor generated by the vaporization process may be discharged directly to the atmosphere or alternately condensed and captured for use as portable water. The residual waste water is thereby concentrated and the cost to dispose of the waste water is greatly reduced.

BACKGROUND OF THE INVENTION

There are many examples where evaporation is used to reduce the liquid phase of water solutions containing contaminants for the purpose of concentrating the contaminants for disposal. Often referred to as thermal separation or thermal concentration processes, these processes generally begin with a liquid and end up with a more concentrated but still pump-able concentrate that may be subjected to further processing and/or disposal. In the context of this description, waste water solutions containing contaminants are referred to as "raw water".

The liquid reduction requirements dictated by the physical characteristics of raw water have resulted in the development of a large range of different types of evaporators over the years. Demands for energy efficiency, minimized environmental impact, low capital cost and low operating cost have driven evaporator development toward various plant type configurations and equipment designs. In the design of evaporation systems, numerous, and sometimes contradictory requirements have to be considered, which may determine which type of construction and configuration is chosen. The resulting principles of operation and economic performance between different designs may vary greatly. By way of background, various design considerations may include:

- Capacity and operational data, including quantities, concentrations, temperatures, annual operating hours, change of product, controls, automation, etc.;
- Product characteristics, including heat sensitivity, viscosity and flow properties, foaming tendency, fouling and precipitation, boiling behavior, etc.;
- Required operating media, such as steam, cooling water, electric power, cleaning agents, spare parts, etc.;
- Capital and collateral financial costs;
- Personnel costs for operation and maintenance;
- Standards and conditions for manufacture delivery, acceptance, etc.;
- Choice of materials of construction and surface finishes;
- Site conditions, such as available space, climate (for outdoor sites), connections for energy and product, service platforms, etc.; and
- Legal regulations covering safety, accident prevention, sound emissions, environmental requirements, and others, depending upon the specific project.

Based on the above, the applications and systems for evaporative concentration of raw water are diverse requiring design decisions being based on the deployment. For example, in some deployments, it is particularly important that mobile water treatment plants are reliable and straightforward to operate by onsite personnel.

One specific application that benefits from the use of an efficient mobile evaporative unit is the onsite processing of raw water generated on and around a drilling rig that is produced from snow or rain accumulations washing over equipment and/or other raw water produced or recovered at the drilling rig lease.

Many environmental regulations prohibit raw water to be discharged directly from the drilling lease surface area onto the surrounding ground regions due to the level of contamination that may be present in the raw water. For example, raw water may be contaminated with oils, soaps, chemicals and suspended particulates originating from the drilling rig operations.

Normally, at a drilling rig, raw water must be collected in peripheral ditches constructed as a first line environmental discharge barrier. In some cases, the volume of raw water may become sufficiently great during rig operations to inhibit the efficient operation of the drilling rig as the volume of raw water interferes with the operation and movement of equipment and personnel at the drill site. In these cases, the raw water must be collected and/or removed to permit drilling rig operations to continue.

Often, in the absence of systems allowing on-site processing, the raw water must be collected from the ditches, stored in holding tanks and eventually trucked to a remote processing center for processing and disposal. As known to those skilled in the art, the collection, storage, transportation, processing and disposal of the raw water at the remote location can be very costly both in terms of actual handling and processing costs but also from lost time at the drilling rig.

In the past, there have been systems to reduce the liquid volume of raw water by boiling off the aqueous phase of the raw water with a mobile water evaporator/boiler. One such system is a diesel fueled boiler that heats the raw water in a tank to boil raw water that may have been pre-clarified through a series of settling tanks mounted on a skid based evaporator system. The raw water is boiled in place to produce a concentrated slurry as the aqueous portion of the raw water is boiled off that settles near the bottom of an evaporator tank by gravity acting on an increasingly dense fluid. This bottom concentrate is periodically removed from the evaporator/boiler system by various systems such as vacuum suction.

There are a number of inherent problems with existing evaporator systems as listed and discussed below. These problems include:

- Systems that must be operated in a batch process mode. In these systems as any new addition of raw water to the bulk storage tanks halts the evaporation process and requires reheating the whole system before vaporization can resume;

The inefficient use of heat energy due to increasingly limited thermal transfer from the heat source to the raw water, that may be caused by:
  a buildup of particulate and scale that coats various parts of the system such as a heat exchanger, promoting increasing heat loss out the heating system exhaust stack; and/or
  the need to thermally heat un-separated, suspended particulates in the raw water tank as the density increases;
Unnecessary fuel consumption, due to overall system inefficiencies. In this case, fuel consumption may have to be increased to meet target processing rates resulting in higher costs to the operator and greater volumes of combustion contaminants being discharged to the atmosphere;
Foaming and frothing of hot or boiling solutions over the sides of the tank into the surrounding environment that may be occurring in close proximity to personnel. Such problems may also require the use of anti-foaming agents and system supervision;
Frequent and time-intensive system cleaning;
Intensive and/or invasive onsite supervision to ensure the evaporator system flow dynamics are within certain narrow parameters to prevent automatic shut down and restarts;
Heating element damage from over-heating due to concentrate accumulation on a heat exchanger; and
Soaps and oils present in the raw water that may cause surface layering that inhibits the evaporation process.

A review of the prior art reveals that contaminated water evaporators can transfer heat to the contaminated water mass using a variety of methods to reduce the volume and weight of the concentrated water for transportation and final disposal.

For example, Canadian Patent 2,531,870 issued Mar. 18, 2008 entitled "Evaporator System" and Canadian Patent 2,554,471 issued Sep. 16, 2008 entitled "Self-Powered Settling and Evaporation Tank Apparatus" exemplify the current commercial prior art of ditch water evaporators. Typically these prior art systems are batch process systems where a tank is filled with the contaminated water and a heat source is applied near the bottom of the tank to transfer the heat to the total mass of contaminated water. The heat source can be any number of heating methods such as steam, electrical resistance heaters and/or hot gasses derived from combustion or hot liquids. In these systems, the heat source must elevate the temperature of the total contaminated water mass in the tank to a level before it can begin to boil off any of the water. Generally, these systems must also reheat the water mass each time additional water is introduced into the reservoir thus significantly slowing the over-all evaporation process.

Over time, evaporation of the water from the tank with the added contaminated water increases the concentration of the non-evaporated constituents within the tank. While these systems will concentrate raw water, it should be noted that as the concentration of the solids and other contaminants in the concentrated water increases, the likelihood that more contaminants from the evaporator will be carried from the system with the evaporated water vapor also increases.

In high temperature driven evaporators, because of the high temperature differential needed to pass heat from the source through the heating element into the water, and because of the presence of chemical salts and other contaminants, the heating element is subject to scaling, fouling and corrosion. Heating element coating creates a significant decrease in efficiency within a very short time and requires frequent and intensive cleaning. Additionally, from the moment the heating element becomes coated (e.g. with scaling), which is almost instantaneous upon system start up, heat is increasingly inhibited from passing through the element into the water and thus is wasted out the flue stack. Complex control systems must sometimes be used with prior art evaporators to account for this fluctuation in exhaust gas temperature over time.

Additionally, when transferring heat through a heating element, the heating element surface area becomes key to the thermal transfer rate and efficiency. Typically the higher the evaporation rate required the more surface area is required on the heat element. Therefore these systems are not scalable on site. If they are to be scaled they must be remanufactured with different physical parameters.

Further still, in these systems, the increasing total solids mass concentration also decreases the efficiency of the evaporator due to the applied heat being absorbed by any solids in the tank. As well, such solids also tend to line the tank surface and cover the heating elements, tubes, and other components in the tank such as level sensors and other monitoring instrumentation that will affect heat transfer and the overall efficiency of operation.

Still further, another significant problem with various prior art systems is the stratification of the waste water due to any soaps or organic material that may be present in the waste water. The presence of either or both of these contaminants will often generate a surface skim or layer on top of the waste water that interrupts the water mass evaporative process. To counter this problem, some past systems incorporate significant complexities into a design to prevent and/or mitigate issues the effects of these contaminants in the water evaporation process. Moreover, soap and/or organic materials can cause significant foaming and frothing that can often result in overflowing the heating tank and spillage onto the ground requiring expensive clean-up operations and/or putting the operator at substantial environmental and safety risk.

A still further problem with various evaporators is particulate material is not removed from the raw water prior to transferring the raw water into the evaporator tank thereby resulting in the need to remove the accumulated solids frequently and/or, as noted above, the unnecessary heating of particulate matter during evaporation. Drains are typically provided in the tank to remove the sludge from the tank; however, the sludge must generally have a high water content in order to permit the sludge to flow through the drain.

Further still, sludge that remains coated on the tank and other elements requires periodic cleaning, usually with steam or water. The sludge and cleaning water, as a product of the cleaning process, must also be hauled away which increases the total cost of operating the evaporator.

Examples of past systems also include those described in U.S. Pat. Nos. 7,722,739, 5,259,931, U.S. Patent Publication No. 2009/0294074, U.S. Pat. Nos. 5,770,019, 5,573,895, 7,513,972, 2,101,112, and No. 6,200,428.

As a result, and in view of the foregoing, there has been a need for thermally efficient, continuous processes for waste water contaminant concentration that can mitigate the various problems associated with the prior art systems.

In addition, there has also been a need for a system with the capability to concentrate waste water using waste heat generated from normal drilling rig operations in order to provide further operational and efficiency advantages over systems in which a regular fuel supply is required.

Further still, there is also a need for a system that is also simultaneously effective in evaporating water and in removing combustion related soot, particulate and combustion chemicals from the heat source if applicable to the particular heating source. In other words, heretofore there has been no incentive for mobile treatment of flue gasses because there is generally no regulation on diesel engine exhaust to justify the cost of doing so. As such, and until regulation is set, the cleaning of these collectively large volumes of acid gasses will not occur. While there are clear environmental benefits to cleaning engine exhaust at a well site, within the current regulatory framework, this will occur if the technology for cleaning exhaust is part of another system. Accordingly, by marrying the technology for cleaning exhaust gasses with another use such as evaporating wastewater, there is an economic incentive to the operator to take this environmentally responsible action.

In regards to the emissions from drilling rig operations, there are generally over 2,000 rigs operating in North America with each one consuming on average approximately 3,000-9,000 liters per day of diesel fuel within the various power generating machinery. For example, for a typical 500 kW engine-generator set, each 500 kW engine, capable of evaporating over 10 cubic meters of water per day, will exhaust approximately 91-273 cubic meters per minute of acid gas exhaust into the environment thereby polluting the environment and wasting the heat energy contained therein. This equates to 95-285 billion cubic meters of uncleaned acid gas discharge from all North American rigs every year.

Thus, there has also been a need for systems that can reduce the amount of exhaust contaminants that may be released to the atmosphere while at the same time reducing the total volumes of contaminated waste water that requiring shipping and/or removal from a drilling rig site.

SUMMARY OF THE INVENTION

In accordance with the invention, there is provided methods and apparatuses to concentrate waste water contaminants. In various embodiments, the invention provides an apparatus and/or method for:
a) simultaneously concentrating waste water and cleaning the gas stream used in its operation;
b) using waste heat energy generated by nearby equipment to reduce new fuel consumption to concentrate raw water;
c) cleaning hot gas source(s) used to minimize the escape of particulate, soot and combustion chemicals into the atmosphere;
d) that require minimal cleaning, due to pre-filtering of the particulate from raw water;
e) enabling the direct interaction between the hot gas and raw water thereby minimizing scaling and thermal losses;
f) having improved fuel efficiency g) having onsite scalability;
h) capable of minimal start up times;
i) capable of quick onsite servicing and cleaning;
j) capable of continuous operation to minimize operation downtime;
k) having less potential for an environmental hazard incident;
l) that is safer for personnel to operate and/or be in close proximity to; and, m) having a simpler construction and therefore less expensive to construct and operate.

In accordance with a first aspect of the invention, there is provided an evaporator for concentrating contaminants within raw water comprising: a first tank for receiving and storing raw water; a raw water evaporator including an insulated flue stack containing a packing material; and a heat source in operative communication with the insulated flue stack, the heat source for providing hot gas to the insulated flue stack at a lower position wherein the hot gas rises within the flue stack through the packing material; a fluid distribution system for distributing raw water to an upper region of the flue stack wherein the raw water flows countercurrent to the hot gas through the packing material; and a concentrated water collection system at a lower end of the insulated flue stack for collecting concentrated raw water.

In further embodiments, the heat source is a hydrocarbon based combustion system operatively connected to the insulated flue stack and wherein the hot gas is a hydrocarbon combustion system exhaust gas. In various embodiments, the heat source is a flame burner.

In another embodiment, the concentrated water collection system is in fluid communication with the first tank.

In another embodiment, fluid from the concentrated water collection system is in heat-exchange contact with fluid in the fluid distribution system for pre-heating fluid in the fluid distribution system before distribution over the packing material utilizing a tube-in-tube or other type of heat exchanger.

In further embodiments, the systems for generating raw water surface area may include structured packing, random packing, a combination thereof and/or spray or atomizing nozzle(s). The packing materials may be in different layers, for example, where the random packing is beneath the structured packing within the insulated flue stack.

In further embodiments, the system may also include a separation system operatively connected to the first tank for separating particulate and organic material from the raw water before delivery to the first tank. In one embodiment, the separation system includes a screen operatively located above the first tank and a distribution manifold above the screen wherein raw water is distributed over the screen by the distribution manifold and passes through the screen to the first tank and wherein the majority of particulate matter does not pass through the screen and is delivered to a second tank.

In another embodiment, components of the system such as each of the first tank, raw water evaporator, fluid distribution system and concentrated water collection system are operatively configured to any one of or a combination of a skid or trailer for delivery to a job site. The skid or trailer may also have a fuel tank for storage of fuel for the heat source and/or the separation system.

In another embodiment of the invention, the heat source is engine exhaust from an adjacent engine and the evaporator includes insulated piping having a first end operatively connected to a lower end of the insulated flue stack and a second end for operative connection to the adjacent engine.

In yet further embodiments, the heat source includes a heat source flue extending into the lower position of the insulated flue stack, the heat source flue having a heat deflection system to radially deflect direct heat from the heat source upon entry into the insulated flue stack. The heat deflection system may also be a stool having an upper plate and at least two hollow legs defining flue openings between the upper plate and heat source flue and wherein raw water impinging upon the upper plate can flow through the at least two hollow legs to the concentrated water collection system.

In another embodiment, the system may also include an inner liner within the insulated flue stack wherein the inner liner is dimensioned to define a fluid reservoir between the insulated flue stack and inner liner for collecting and receiving downwardly flowing raw water for providing cooling and insulation to the lower position of the insulated flue stack.

The system may also include a control system including at least one thermocouple for monitoring the temperature within the insulated flue stack and at least one pump for controlling the flow of raw water to the fluid distribution system.

In another embodiment, the system also includes an insulated gas expansion chamber operatively connected to the insulated flue stack, the insulated gas expansion chamber having dimensions to allow a high velocity flame to fully develop.

In another embodiment, the random packing has a volume sufficient to dissipate a hot gas temperature in a range of 300° C. to 1,500° C. to a hot gas temperature in the range of 50° C. to 1,000° C. before entering the structured packing.

In yet another embodiment, the evaporator includes a second insulated flue stack adapted for configuration to an alternate heat source.

In yet another embodiment, where the system is adapted for configuration to an adjacent engine, the insulated flue stack and insulated gas piping have a total back pressure to the adjacent engine enabling the adjacent engine to operate at less than 100 cm water column of back pressure.

In another embodiment, the system simultaneously evaporates water and removes particulate, soot and combustion chemicals from the gas stream.

In another aspect, the invention provides a method of evaporating raw water comprising the steps of: providing heat in the form of hot gasses to a flue stack; distributing raw water within the flue stack by a surface area generating technique; causing the raw water to come into direct contact with the hot gasses; and, collecting concentrated raw water from the flue stack.

In further embodiments, the raw water is sourced from drilling rig operations and/or around a drilling rig site.

In one embodiment, packing material is used to generate raw water surface area within the flue stack.

In another embodiment, any one of or a combination of spray nozzles and atomizing nozzles are used to generate raw water surface area within the flue stack.

In various embodiments, raw water is flowed countercurrent to the flow of hot gases in the flue stack, concurrent to the flow of hot gases in the flue stack or perpendicular to the flow of hot gases in the flue stack.

In another embodiment, the invention provides the further step of pre-heating the raw water by placing the concentrated raw water in heat exchange contact with the raw water prior to distributing the raw water to an upper region of the flue stack.

In another embodiment, the invention provides the further step of controlling the temperature within the flue stack to minimize formation of scale on the packing material.

In another embodiment, the invention provides the further step of controlling the temperature within the flue stack to minimize the formation of corrosive chemicals within the packing material.

In another aspect, the invention provides a method of removing soot, particulate matter and/or chemicals from diesel engine exhaust comprising the steps of: providing diesel engine exhaust to a flue stack; distributing raw water within the flue stack by a surface area generating technique; causing the raw water to come into direct contact with the diesel engine exhaust; and, collecting concentrated raw water containing diesel engine exhaust contaminants from the flue stack.

In a still further aspect, the invention provides a method of simultaneously evaporating raw water and removing soot, particulate and/or chemicals from flue gasses and/or engine exhaust comprising the steps of: providing heat in the form of hot gasses to a flue stack; distributing raw water within the flue stack by a surface area generating technique; causing the raw water to come into direct contact with the hot gasses; and, collecting concentrated raw water from the flue stack and wherein the hot gases can be sourced from flue gasses and/or engine exhaust.

The method may further comprise the step of preheating the raw water by placing the concentrated raw water in heat exchange contact with the raw water prior to distributing the raw water to an upper region of the flue stack.

The invention is described with reference to the following figures.

DETAILED DESCRIPTION OF THE INVENTION

With reference to the Figures, various apparatus and methods for concentrating raw water are described.

Overview

Figure 1:
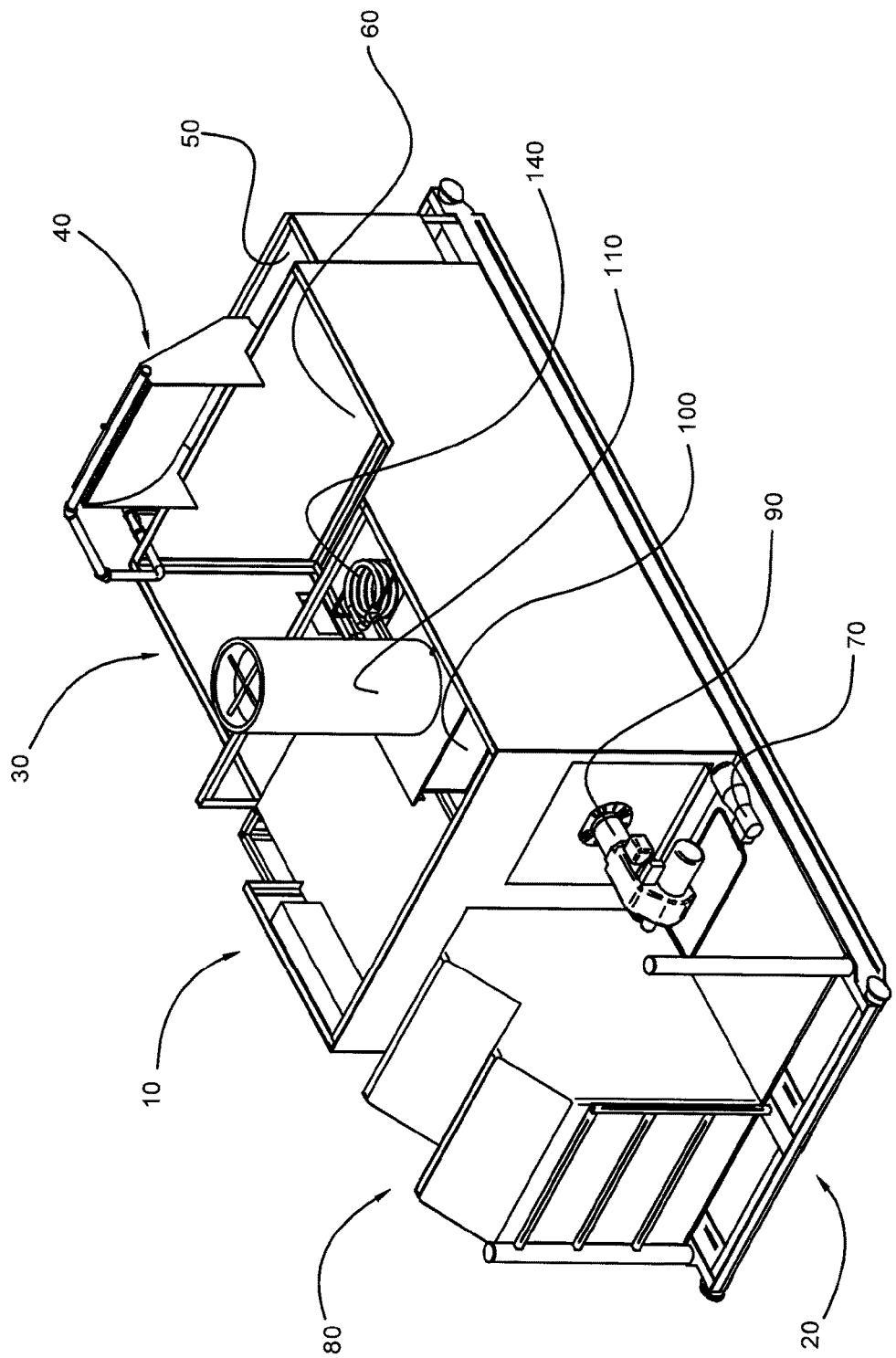
FIG. 1 is a right-hand isometric view of a concentrator system in accordance with one embodiment of the invention.

FIG. 1 shows a contaminant concentrator system (CCS) 10 mounted to an oilfield type skid 20. The CCS generally includes a tank system 30 including first tank 60 and second tank 50, evaporator stack 1 10, filter system 40, fuel storage system 80, pump 70, burner 90, heat exchanger 140 and flue gas expansion chamber 100.

The filter system 40 is mounted on tank system 30 and receives raw water from a source for initial particulate separation in which particulates are separated to second tank 50 and liquid raw water to first tank 60. Pump 70 pumps raw water from tank 60 through heat exchanger 140 to the interior of the upper section of evaporator stack 110 where an evaporation process takes place as will be explained in greater detail below. Burner 90 provides heat to the evaporator stack through flue gas expansion chamber 100 and the burner receives fuel from the fuel storage tanks 80. Concentrated raw water is removed from the evaporator stack through the heat exchanger and is returned to the first tank.

Figure 2:
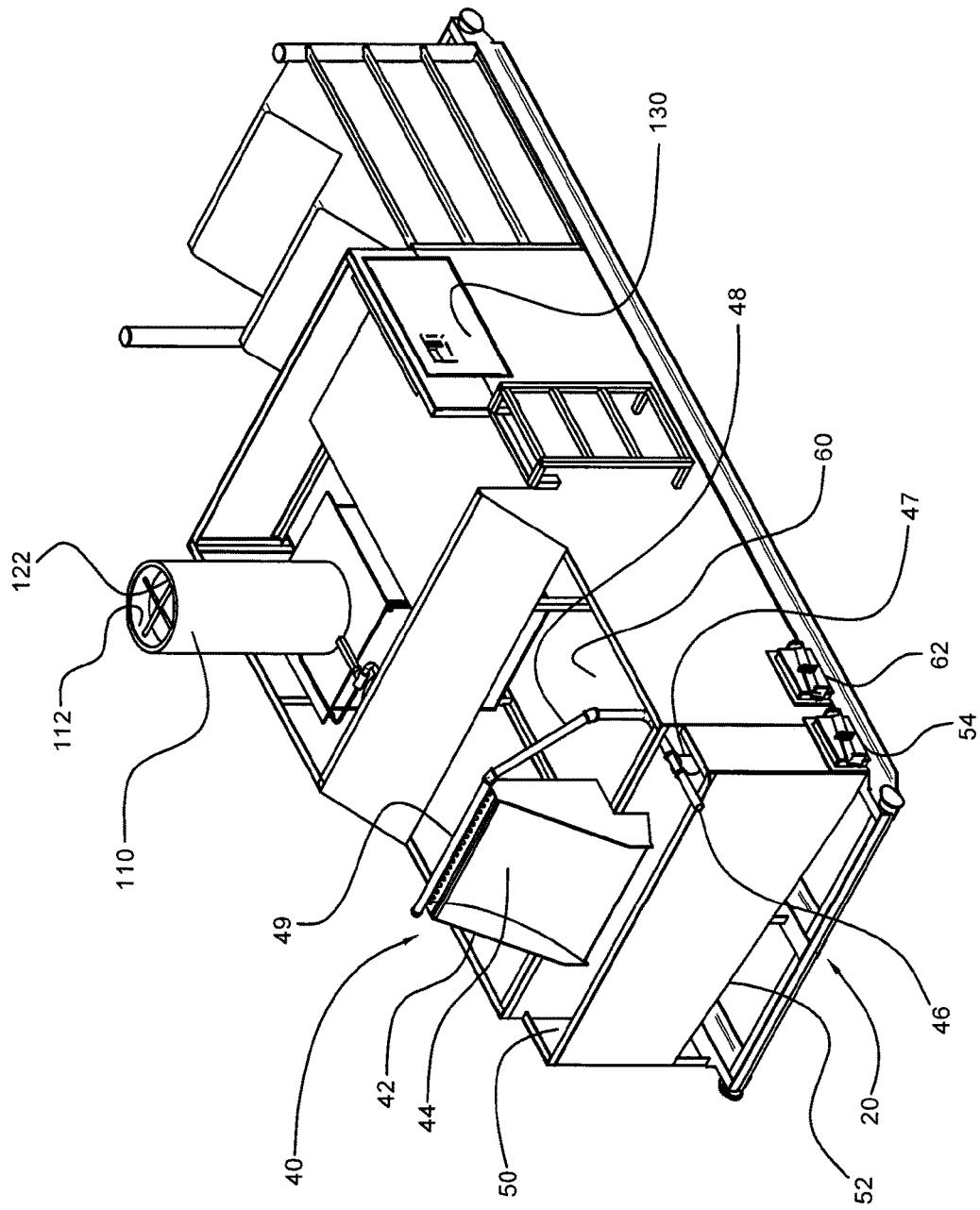
FIG. 2 is a left-hand isometric view of a concentrator system in accordance with one embodiment of the invention.

As shown in FIG. 2, further details of the system are described. A raw water inlet pipe 46 is connected to an inline basket strainer 47 which in turn is connected to flow line 48 and raw water distributor line 49 for distribution of raw water to the filter system. The filter system 40 includes a curved metal filter screen 44 which is held in place by side support 42 (typically in 2 places) which is attached to tank 60. Second tank 50 has a sloped bottom 52 and a discharge dump gate 54 for allowing particulate materials to be removed from the second tank. First tank 60 also has dump gate 62 for allowing discharge of contents of the first tank.

Programmable logic controller (PLC) base controls 130 are shown configured to the side of raw water tank 60 and is configured to a thermocouple 122 within the evaporator stack and the pump 70.

Evaporator Stack

Figure 3:
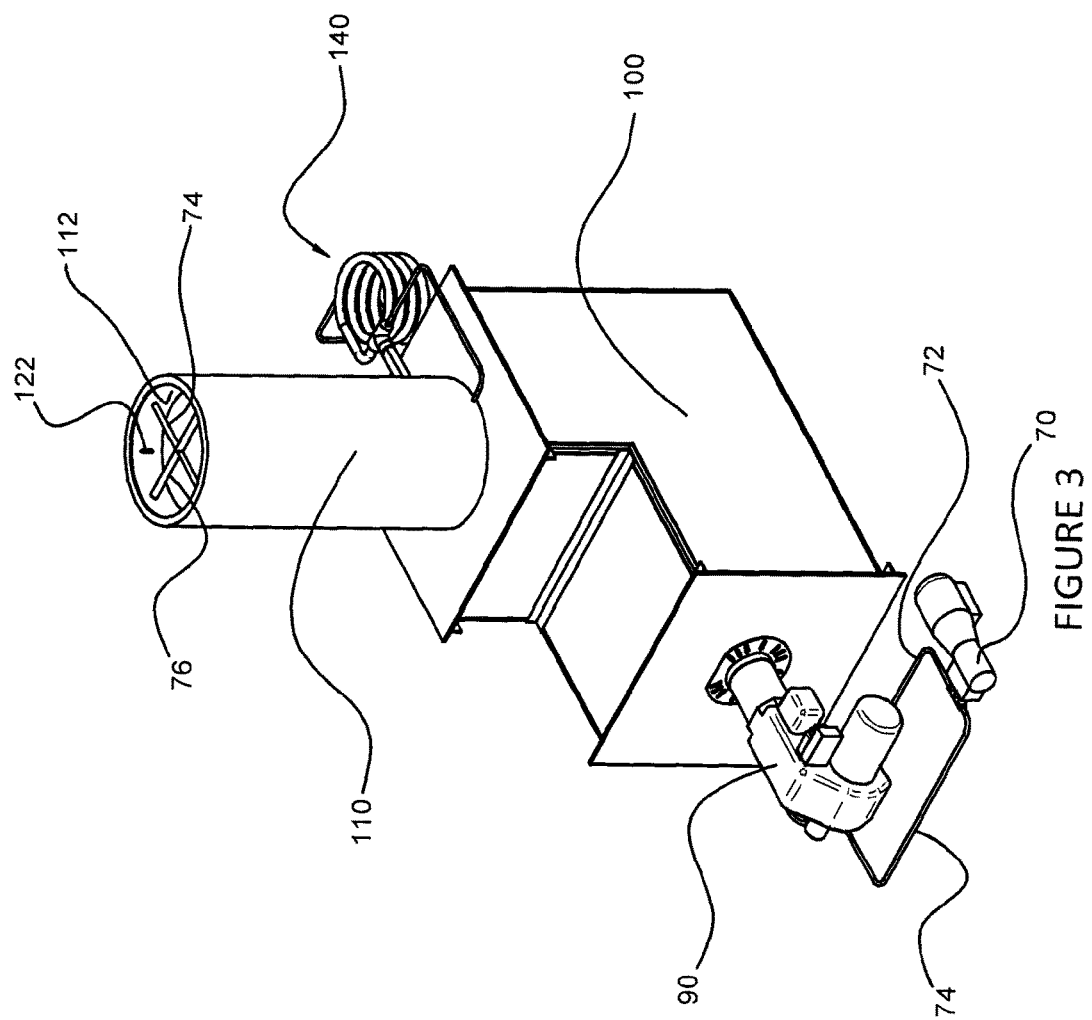
FIG. 3 is a right-hand isometric view of an evaporator assembly in accordance with one embodiment of the invention.
Figure 4:
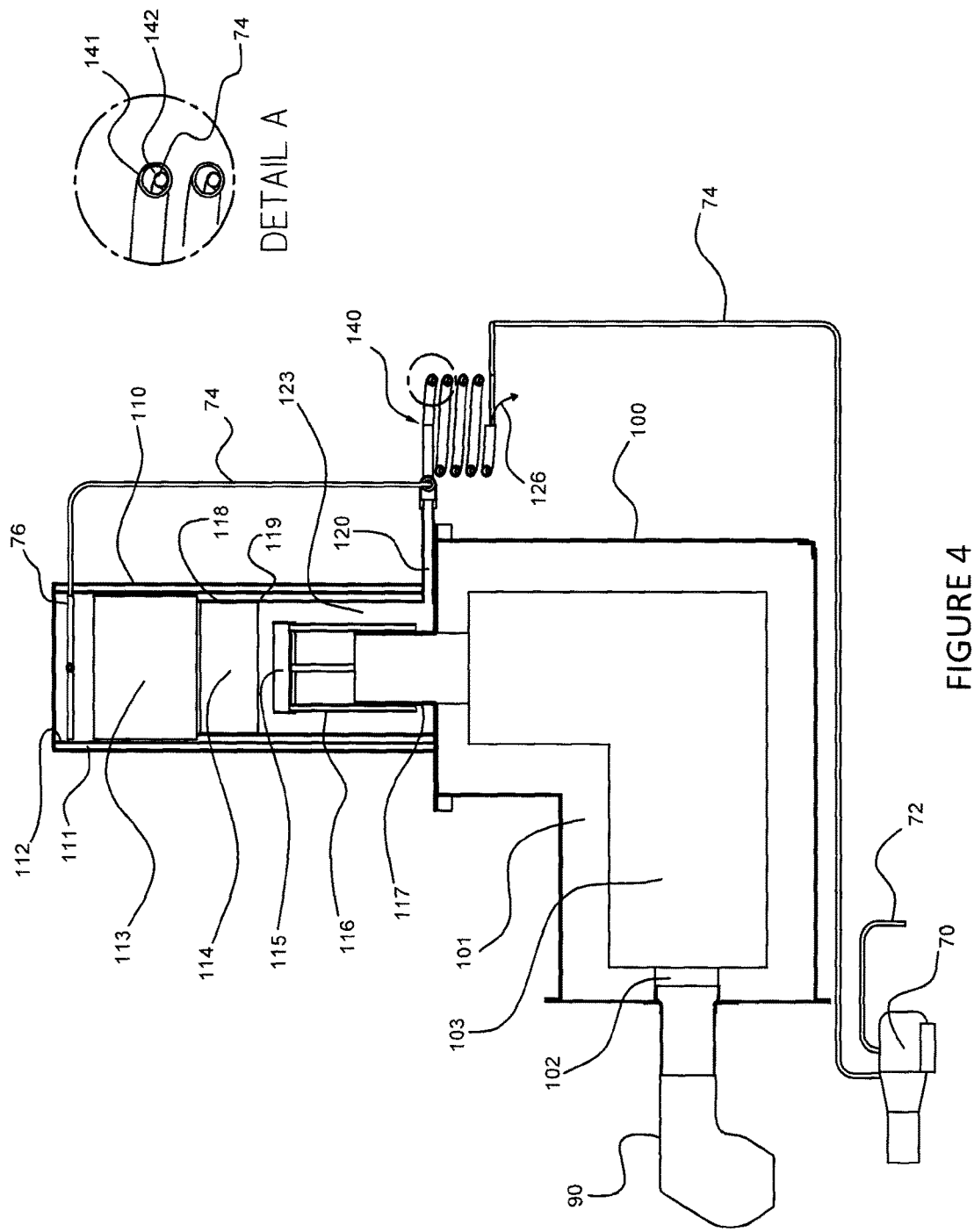
FIG. 4 is a cross-sectional view of an evaporator assembly of FIG. 3 in accordance with one embodiment of the invention.
Figure 4A:
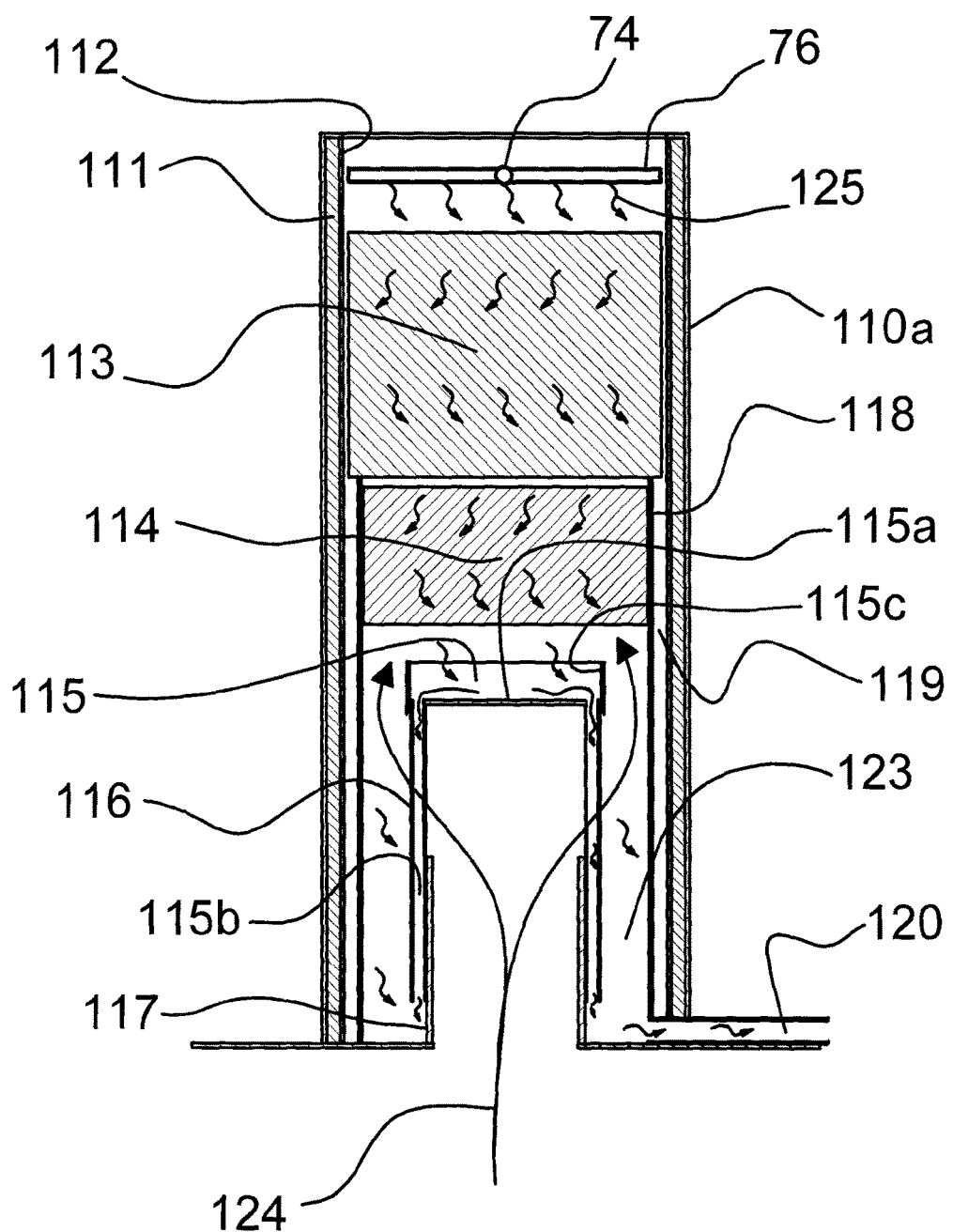
FIG. 4A is a cross-sectional view of an evaporator stack of FIGS. 3 and 4 showing further details of the evaporator stack in accordance with one embodiment of the invention.

With reference to FIGS. 3, 4 and 4A, components of the evaporator circuit are described. As noted above, pump 70 is connected to first tank 60 by suction line 72 that draws water from the first tank that is then pumped through discharge line through heat exchanger 140 to a raw water distribution system 74, 76 at the upper portion of the evaporator stack. In a preferred embodiment, the suction line includes a flexible intake hose configured to a float that draws raw water from a depth just below the liquid surface within the first tank. Burner 90 is connected to the interior of combustion gas expansion chamber housing 100 which is connected to the interior of evaporator stack 110 as shown in greater detail in FIG. 4.

FIGS. 4 and 4A illustrates the cross-sectional interior of the evaporator stack of FIG. 3. The evaporator stack 110 includes an outer wall 110a and an inner wall 112 defining an annular space containing insulation 111. The evaporator stack is mounted on the upper surfaces of the burner assembly 100 around flue 117 that projects a short distance into the evaporator stack. The flue operatively supports collector stool 115 that is positioned over the flue. The collector stool has a top surface 115a, hollow side legs 15b and lip 115c that collectively define side openings allowing exhaust gases from the burner to enter the evaporator stack 110. The lip 115c extends upwardly from top surface to prevent raw water 125 within the evaporator stack from entering the expansion area 103.

As shown in FIG. 4A, an inner packing support pipe 116 is provided inside the inner wall 112 at a distance that defines annular space 119. The inner packing support pipe 118 supports packing material above the collector stool and below the raw water distribution system. As explained in greater detail below, packing materials preferably includes a random packing material 114 and a structured packing material 113. A concentrated raw water outlet 120 is provided that is in fluid communication between the lower space 123 and the exterior of the evaporator stack.

In operation, pre-heated raw water from the heat exchanger is pumped from the fluid distribution system 74, 76 where the raw water flows downwardly through the interior of the evaporator stack 110 over the structured packing 113 and random packing 114 and countercurrent to rising hot gas 124 from the burner. As the raw water is falling, it is subjected to evaporation and hence concentration and the burner exhaust with water vapour is released to the atmosphere through the top of the evaporator stack. After passing through the packing material, the raw water will fall to top surface 115a of the collector stool 15, downwardly through legs 115b where it will flow from the evaporator stack through outlet 120.

In addition, the falling raw water will also flow along the interior wall 112 and enter and fill annular space 119 where it will be subjected to heating and gentle boiling. Advantageously, the water-filled annular space will contribute to insulating against thermal losses from the stack as well as cooling the inner surfaces of the inner packing support pipe. As raw water is boiled out of the annular space 119 or otherwise overflows the annular space, additional raw water will flow in, hence maintaining a degree of circulation within this space. Generally, the dimension of the annular space should be controlled to ensure that explosive boiling within the space does not occur.

The drain pipe 120 is connected to heat exchanger 140 where hot concentrated raw water 126 is drained from the lower end of interior space 123 into the heat exchanger interior space 142 and to the first tank 60.

It should also be noted that other designs could incorporate either perpendicular or concurrent flow within the evaporator stack to effect evaporation.

Burner

As shown in FIG. 4, burner 90 is connected through flow connector 102 into the interior of gas expansion chamber 100 with gas expansion area 103. Gas expansion area 103 is connected to interior space 123 through flue 117. Insulation 101 is located within gas expansion chamber 100 to insulate the gas expansion chamber 100.

Burner 90 is a typical a forced air burner (e.g. a diesel burner) drawing fuel from tanks 80. Fuel and air are mixed and atomized within the combustion chamber to produce a high heat density and high velocity flame.

Figure 5:
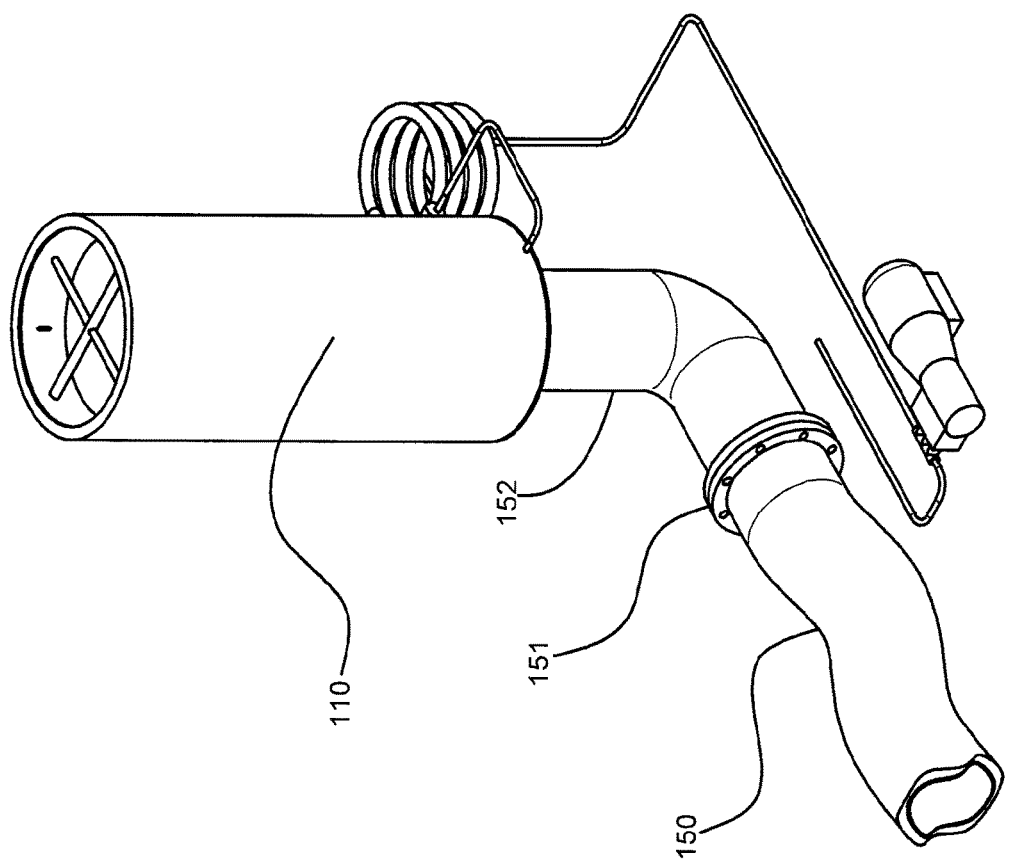
FIG. 5 is a right hand isometric view of an alternative evaporator assembly in accordance with one embodiment of the invention.
Figure 6:
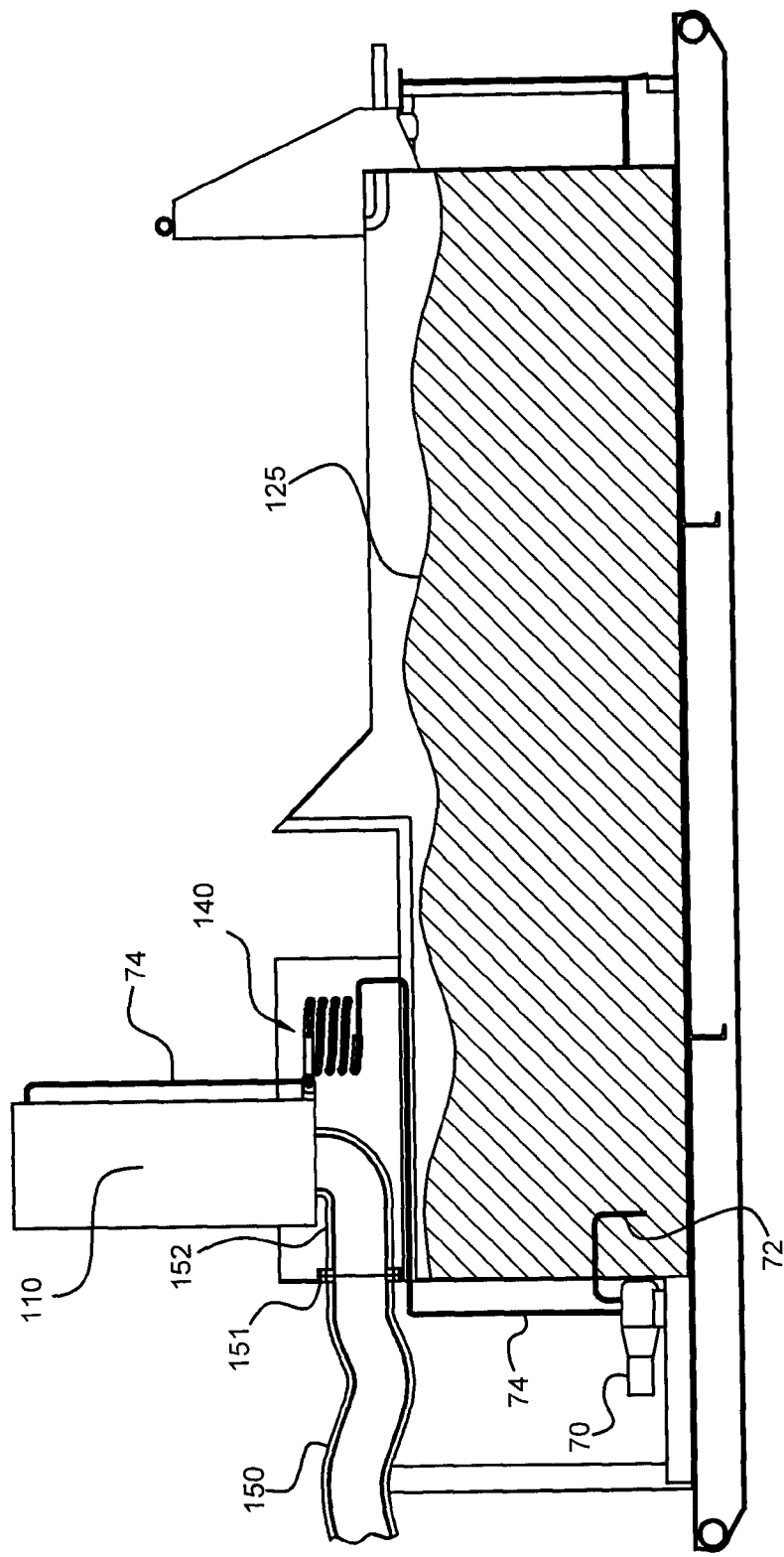
FIG. 6 is a schematic cross-sectional view of an embodiment of a concentrator system having an alternate evaporator assembly.

Importantly, as shown in FIGS. 5 and 6, the heat source can be configured to other heat sources including various types, models and sizes of forced air/fuel burners and/or the exhaust generated by an alternate heat source such as engine. Examples of alternate heat sources at a drilling rig include electrical generator engines that run various equipment such as mud pumps. The capture of heat exhaust from an engine can be captured and flowed to the system through an insulated hose 150 as a standalone heat source. As shown in FIGS. 5 and 6, an insulated hose 150 is connected to evaporator stack 110 through insulated flow line 152 by coupling 151.

Figure 7:
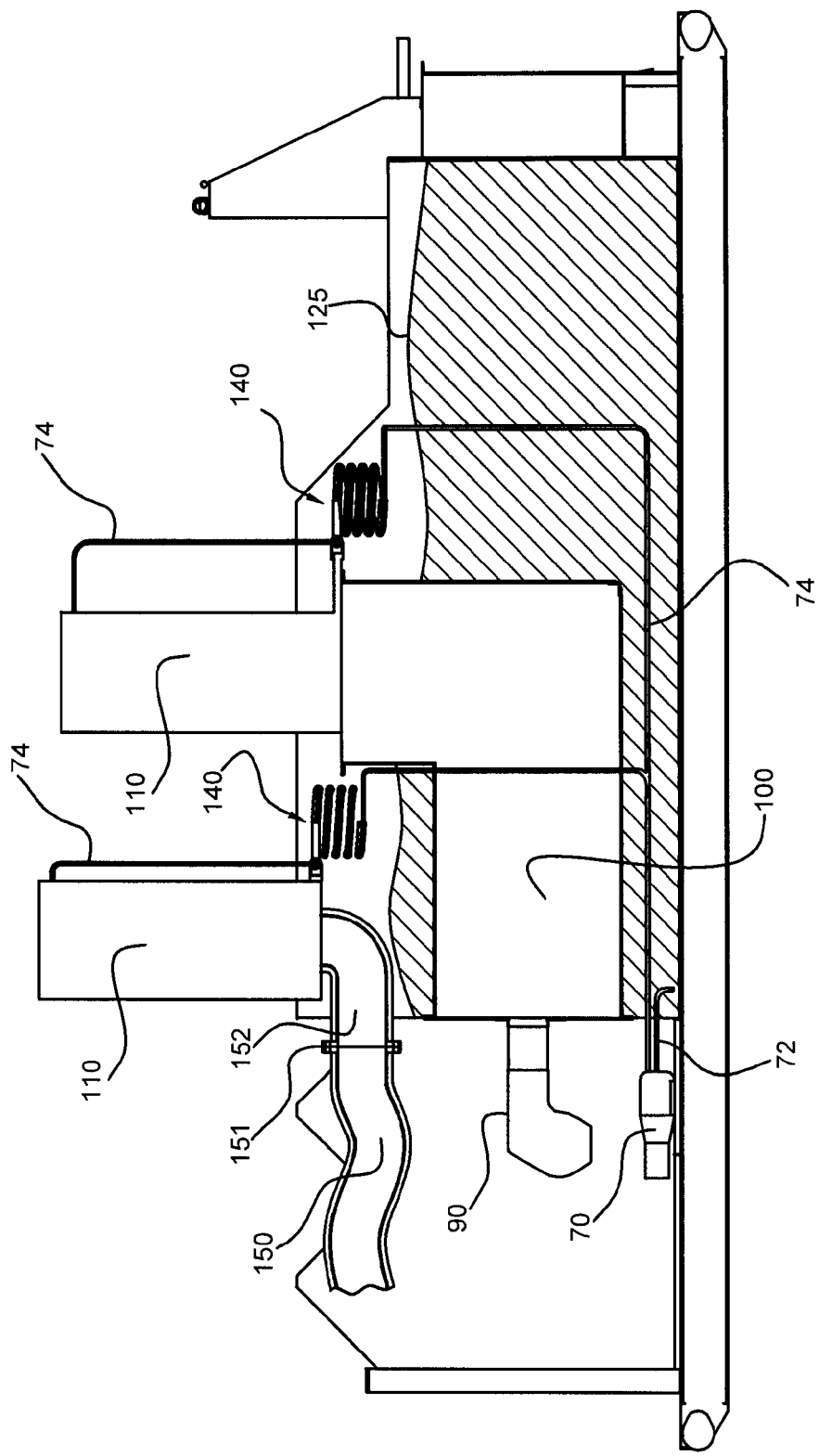
FIG. 7 is a schematic cross-sectional view of an embodiment of a concentrator system having two evaporator assemblies.

A further embodiment is shown in FIG. 7, in which a duel system is provided. In this embodiment, the system includes two insulated flue stacks 110 each configured for a different heat source thus providing the operator with the opportunity to choose the most efficient or combined heat source for a given installation. In the event that adjacent engines are not present to enable the utilization of waste heat from the adjacent engine, the system could be changed over to the diesel burner heat source. As both insulated flue stacks draw water from the same first tank, the change-over can be completed quickly. The embodiments of FIGS. 6 and 7 are configured to process raw water 125.

An effective diesel burner is a Beckett Model CF-1400 diesel burner capable of supplying approximately 900,000 Btu/hr resulting in the processing of approximately 9 cubic meters per day of raw water. With the optimized air settings on the burner of approximately 30 cubic feet per minute (CFM) intake air per gallon/hr of diesel consumed will create a gas temperature of approx 800° C. which is cooled to approximately 75° C. as it exhausts the evaporation stack 110 as exhaust saturated with water vapor.

Filter System 40

As noted above, raw water is initially pumped through piping 46 to and through an inline basket strainer 47 to remove large particulate contaminants greater than approximately one quarter of an inch in diameter.

The raw water is pumped through piping 48 from the inline basket strainer 47 to distributor manifold 49 where the raw water is discharged evenly across the top of screen filter 44. The screen filter 44 is preferably a curved v-wire screen designed to remove suspended particulate down to approximately 25 microns. Other types of pre-filtering system that can be substituted for screen type filter 44 as known to those skilled in the art include but are not limited to filter systems such as electric powered self cleaning (self purging) filters, filters that trap particulate, hydro-cyclones and centrifuge type particulate separators. The screen filter 44 is design to separate and direct the separated particulate into second tank 50 where the waste material is stored for periodic removal.

Second Tank

The second tank 50 has a sloped bottom 52 to passively direct the waste material to dump gate 54 which makes the cleaning process fast and efficient for the operator.

First Tank

Raw water passing through screen filter 44 flows into first tank 60. The first tank has sufficient volume such that it serves as both a storage and settling tank wherein at normal operational flow rates, the raw water in the first tank will settle and stratify due to the absence of significant fluid circulation that would otherwise mix the tank contents. Operationally, this will improve the efficiency in that the settling of denser liquids, and particles (including salt precipitates) will minimize the amount of heat used to heat suspended particles.

Operational and Design Considerations

Generally, for every 100,000 Btu/hr of hot gas stream, a properly insulated system should evaporate approximately 1 cubic meter of water per day. Thus, for a given 900,000 Btu/hr input, the system should evaporate approximately 9 cubic meters of water per day. As it is known that for 3.8 liters of diesel consumed, 140,000 Btu/hr heat energy is generated, therefore a 900,000 Btu/hr system will consume approximately 24.6 liters/hour (LPH) of diesel. This equates to approximately $50 in diesel consumption per cubic meter of water evaporated. This compares to typical prior art boiler evaporators where the cost of evaporation is typically in the range of $150 in diesel per cubic meter of water evaporated because of thermal losses and system inefficiencies.

Similarly, using the waste heat from a diesel engine would accomplish the same evaporation for an effective rate of $0 in extra fuel cost per cubic meter of water evaporated. As such, the fuel savings are highly attractive to potential operators, especially as the use of exhaust heat in the system has the added benefit of reduced acid gas emissions from diesel exhaust that would otherwise be discharged into the environment due to the scrubbing effects within the evaporator stack. That is, the system can be highly effective in removing particulates, soot and other combustion chemicals from the gases within the evaporator stack. Accordingly, the system can be operated as an evaporator, an exhaust gas cleaning system (effectively without or with minimal evaporation) or as a combination of both.

Furthermore, the particular type of raw water effluent sourced from drilling operations can further enhance the ability of the system to clean exhaust gasses. For example, boiler blowdown, a type of chemically contaminated waste water produced during drilling rig operations, is normally kept at a high pH by rig personnel. This is done by adding costly alkaline chemical additives to water used in the rig boiler system so as the alkaline water/steam circulates though drilling equipment scaling effects are minimized. Accordingly, the boiler blowdown is highly contaminated water, and because of its alkalinity can be a highly effective effluent for neutralizing acid gasses or engine exhaust. Thus, as a neutralizing agent, this alkaline solution can assist in preventing acid gasses from escaping the flue stack and is, therefore, another example of how the present invention can make use of a readily available, expensive and typically a waste product, with no additional cost to the operator as its cost has already been paid for in other drilling rig operations. Therefore, the chemical nature of the raw water to be evaporated can come in a form that assists the system in a second or standalone function of cleaning the gasses used to evaporate the raw water.

Furthermore, if desired the system can be operated at a higher firing rate, resulting in faster water evaporation in a given timeframe by simply increasing the pressure of the fuel pump, changing the nozzle with one of more capacity and/or increasing the air intake setting on the burner. As known to those skilled in the art, scalability is desirable because in times of high rainfall, the operator will often need to increase the process rate. Importantly, the subject system allows a rapid processing rate increase rate simply by increasing flow rates and burner temperatures without the delay or the off-site remanufacture typical in the prior art.

Further, using the exhaust heat from a engine/generator system alone or in combination with a forced air fuel burner, typically ranging from 500 kWh to 1,000 kWh (1.5M-3M Btu/hr) for use on a drilling rig for example, would provide sufficient heat energy to process an additional 10 to 20 cubic meters of raw water per day with no new cost to the operator, as the cost of the combusted fuel has already been paid for in other operations.

Importantly, the use of waste engine exhaust heat requires control/monitoring of the backpressure being exerted on the engine's exhaust system. In a typical operation, this is typically 100 cm of water column (WC). The subject system is designed to operate between 1-2 cm of WC due to the lack of significant flow resistance within the random packing, structured packing, a combination of both and/or spray or atomizing nozzle flow path.

The methods of generating large amounts of raw water surface area can be important to the efficient rate of thermal mass transfer of heat from the hot gas into the raw water for the purpose of evaporation. More specifically, random packing rated for above 150 $m^2/m^3$ with 75%-98% void space is preferred and structured packing with 500 $m^2/m^3$ with 98%+/−void space is preferred for use with a 500 kWh engine having an exhaust flow rate of approximately 3,200-3,400 CFM with a temperature of 500-700° C., or other fuel combusting device such as a diesel burner producing gasses over 800° C. As an alternative of generating large amounts of raw water surface area and distribution within the flue stack, atomizing nozzles or spray nozzles can be used alone or in conjunction with packing material.

The acidic nature of the gas stream should also be considered to avoid corrosion, pitting and weakening of materials used in the apparatus due to the high temperatures involved. For example when sulfur oxides in the diesel gas stream react with raw water, diluted sulfuric acid (liquid) is formed which in turn can react with different chemicals within the waste water. As a result, ceramic random packing is the preferred choice for a surface area matrix for the hot gas to contact first because of its corrosion resistance and high heat tolerance. By flowing the hot gas through the random packing first, the gas is cooled prior to entering the structured packing thus preserving the structured packing life, as structured packing is generally made from thinner alloys. A 10" layer of random packing is sufficient to reduce the gas temperature from approximately 800° C. to 150° C. For the structured packing Hastelloy C22 is preferred for its resistance to oxidizing corrosives, stress corrosion and thermal stability at temperatures ranging from 650° C.-1,040° C. Stainless Steel can be used as well, but will usually need more frequent replacement.

Scale buildup poses another problem as soot and particulate plus the salts from chemical reactions are concentrated into a reduced water volume in the column. These chemical and heat issues are controlled by maintaining sufficient flow of concentrated water returning to the first tank. Because the concentrated raw water is flowing through a heat exchanger the heat is retained in the column. This is important to prevent and/or control scaling as the water feed rate can be increased, and although the ratio of evaporation to feed water changes, the overall evaporation rate remains substantially constant. As a result, the system has the benefit of having more water flowing as concentrated raw water and therefore can be used to maintain a cooler temperature within the column with limited scale buildup.

To further minimize maintenance requirements of periodically removing scale, the preferred packing configuration of random packing adjacent the burner and structured packing in the upper portion of the evaporator stack, provides cost advantages as the majority of scaling will occur in the lower regions of the evaporator stack and the random packing is generally cheaper to replace than the structured packing if scaling necessitates cleaning and/or replacement. In another configuration, raw water sprayed from nozzles beneath the packing material countercurrent directly into the gas stream, can also assist in limiting scaling while cooling the gas prior to it entering a packing material.

Burner 90 can be augmented with an additional fan to force additional air into the burner system to provide an excess of dry air to ensure the exhaust fluid will not fully saturate.

The discharge plenum 102 and hot gas expansion chamber 103 are formed as a cavity within a high density insulation material 101 held in place by combustion expansion chamber housing 100. The high density insulation material 101 provides sufficient insulation to ensure a maximum amount of heat energy generated by the combustion process is retained within that portion of the hot gas circuit. In one embodiment, approximately 9 lbs/ft$^3$ folded ceramic blanket anchor lock insulation modules are used which are rated to have over 800° C. on the hot face while keeping the cold face below 35° C. with a low thermal conductivity rating. This ensures the water in the tank is close to ambient temperature and the heat stays in the expansion chamber, heat exchanger and evaporator system.

An additional benefit of this choice of insulation modules is that the folded blanket modules compress against one another as they are anchored to the walls of the combustion chamber so repeated firing in the chamber will not shrink the insulation allowing heat to penetrate the insulation as is the case using traditional ceramic insulating fiber board. Further, this style of ceramic blanket module will not become brittle, as will traditional fiber board from repeated firing. This is beneficial for a mobile system that will be loaded and unloaded from transport trucks, driven over non-paved roads and subjected to extreme vibration such as mobile units delivered to remote drilling sites.

Raw water is drawn into and through suction line 72 from raw water tank 60 by the action of pump 70. Although there are a great range of pumps that can be used, the preferred embodiment would be a vertically mounted centrifugal pump. Unlike other pumps, because there are no seals as barriers to flow, the centrifugal pump will allow the water in the pipes of the system to self-drain when the pump is shut off (provided the line required to be so drained is above the pump and the water level in the storage tank 60 is below the pump). This is beneficial particularly when the system is operated in sub-zero temperatures. In addition, a self draining system design reduces the possibility of feed lines freezing and bursting when the system is not in operation, thus improving reliability and other operational costs. Alternate pumps styles could also include positive displacement pumps and diaphragm pumps with an associated glycol reservoir to fill the water lines upon system shutdown.

Other heat exchangers can be used in place of the preferred tube in tube, for example a plate heat exchanger. In the preferred embodiment, because gravity is acting on the concentrated water returning to the tank, the outer tube 141 should be large enough to allow complete free flow of discharge liquid back into tank 60. Thus, with sufficient volume in space 142 the concentrated water will preferentially flow only in the bottom area of space 142. This means that tube 74 should be placed at the bottom of space 142 in order to facilitate the transfer of the heat in the concentrated raw water stream through the surface area of the feed line 74 and into the feed water. By way of example, for a system that evaporates 9 cubic meters of water per day, a 12 meter heat exchanger is sufficient and to save space is helically wound next to the riser but also to promote the downward flow particularly in the event if the skid is not level at a job site. This method allows the concentrated raw water, (typically about 98° C.) to give off its sensible heat to the feed raw water. The concentrated raw water is thereby cooled to within a few degrees of the feed water before being discharged back into the first tank hence preserving heat in or adjacent to the evaporator stack.

The feed water pumping rate depends on the desired evaporation rate. Typically, the system would be set to pump a feed rate approximately 20% or more above the desired evaporation rate as determined by the Btu input of the chosen hot gas source.

The hot gasses distributed radially around the collector stool 115 flow firstly into and through random packing 114 where the hot gasses are distributed through the volumetric space presented by the random packing 114 and thereby comes into contact with raw water flowing through the random packing 114. The hot gasses are subjected to a $1^{st}$ level of counter flow heat transferred to the raw water. This first interaction of the gas and water in the random packing allows for scaling, significant cooling of the gas and chemical reactions to take place in the less expensive, thermally stable (at high temps) and corrosion resistant layer. It is also in this region that the sulfur oxides in the exhaust gasses, soot and particulate are predominantly removed from the gas stream and allowed to flow out drain 120 with the concentrated reject water. Adding to this function in the hot gas flow region is the water spilling over 118 from space 119 directly into the annular space between collector stool 115 and wall 119 which further adds to the gas cooling effect.

The hot gasses passing though the random packing 114 then pass into and through structured packing 113 where the hot gasses are subjected to a $2^{nd}$ level of counter flow heat transfer to the raw water flowing vertically downward through the structured packing 113. This structured packing layer, with a much higher surface area to volume ratio, completes the evaporation process bringing the gas and water vapor mixture to a temperature of approximately 75° C. as it is discharged into the atmosphere.

As a result, the heating of the raw water by forcing the direct interaction of the hot combustion gasses and raw water allows for a highly efficient thermal mass transfer. Other types of materials and configurations can be used for effecting the interaction between the hot combustion gasses and the raw water with varying levels of efficiency including but not limited to machine shop cuttings, mushroom cap bubblers, spray or atomizing nozzles, random packing and structured packing.

Various means can be used to distribute the raw water over the top of the structured packing 113, such as spray nozzles, atomizing nozzles, gravity distributor and a "T" type distributor. Those systems that minimize pressure drops and entrainment are preferred.

If dry vapor discharge is required, a mist eliminator (not shown) can be installed within the evaporator stack 110 to trap entrained liquid droplets from being carried in the exhaust vapor thereby providing greater dwell time for the liquid droplets to vaporize and be passed into the atmosphere as pure vapor.

The control of the system is enabled by a minimal number of control points. A Programmable Logic Controller (PLC) or Simple Logic Controller (SLC) unit provides the necessary system to measure the input of specific temperature levels of the exhaust fluids proceeding from the interior of the evaporator stack 110, to ensure startup procedures operate correctly. In the preferred embodiment the thermocouple serves only to signal system shutdown if either the pump or the burner stop operating as sensed by a significant increase or decrease in temperature during operation. In another embodiment the thermocouple is designed to analyze the information and generates a control signal to adjust the volume of raw water feed into the system which will in turn modulates the exhaust temperature (this method of sensing may only be needed in the absence of the heat exchanger in the system). A single thermocouple 122 placed within the interior space formed by interior tube surface 112 provides the operating temperature within the interior space defined by interior wall 2. The PLC in turn adjusts the speed of pump 70 to modulate volume of raw water being feed into the system. By adjusting the raw water feed as a function of the amount of heat being generated at any given time, the optimum evaporation can take place. The monitoring and adjustment of temperatures within the interior of the evaporator stack 110 is thereby used to effectively maximize the vaporization of the raw water. The thermocouple 122 senses the temperature of the fluid vapor in the exhaust gasses and when the temperature varies from approximately 75° C. a variable frequency drive (VFD), controlled by the PLC will adjust the pump 70 speed to modulate the evaporation system operation to generate fluid exhaust temperatures within the optimum range for the desired output. Generally, once the parameters are set, the system will not require any further attention and will operate automatically within the preset ranges.

Although the invention has been described and illustrated with respect to preferred embodiments and preferred uses thereof, it is not to be so limited since modifications and changes can be made therein which are within the full, intended scope of the invention as understood by those skilled in the art.

What is claimed is:

1. An evaporator for vaporizing raw water from oilfield operations and concentrating contaminants within the raw water, where the raw water contains oil, salt and particulate contaminants comprising:
   a raw water evaporator having a stack and a flue connected to a hot gas source where the hot gas is a combustion gas where the stack receives hot combustion gas at a temperature in a range of 300° C. to 1,500° C. from the flue, and wherein the stack is operatively positioned over and surrounding the flue;
   a raw water distribution system configured to distribute raw water within the hot combustion gas within the stack to increase raw water surface area;
   a control system and pump operatively connected to the raw water distribution system, the control system and pump operable to distribute a flow rate of raw water through the raw water distribution system based on at least one temperature within the stack while maintaining raw water flow sufficient to minimize scaling within the raw water evaporator during operation to enable optimum evaporation of water within the flue; and
   a concentrated raw water collection system connected to the stack for collecting concentrated raw water from the stack and recirculating raw water to the stack.

2. The evaporator of claim 1, further comprising a first tank operatively connected to the raw water evaporator, the first tank for receiving and storing raw water and concentrated raw water from the raw water evaporator.

3. The evaporator of claim 2, wherein the first tank has a sufficient volume to allow raw water stratification through settling.

4. The evaporator of claim 3, wherein the raw water has a liquid surface within the first tank, further comprising an intake configured to a float that allows raw water to be drawn from a depth below the liquid surface within the first tank for delivery to the raw water distribution system.

5. The evaporator of claim 1, wherein packing material is used to generate raw water surface area within the stack and wherein the packing material includes any one or combination of structured packing and random packing.

6. The evaporator of claim 1, further comprising one of or a combination of spray nozzles and atomizing nozzles to generate raw water surface area within the stack.

7. The evaporator of claim 1, wherein the hot combustion gas enters the raw water evaporator at a lower position and the hot gas rises within the stack through the distributed raw water and wherein the stack includes a drain preventing raw water from entering the flue.

8. The evaporator of claim 2 wherein, the concentrated water collection system is in fluid communication with the first tank and includes a heat exchanger wherein concentrated raw water from the concentrated raw water collection system is in heat-exchange contact with raw water in the raw water distribution system, the heat exchanger for pre-heating raw water in the raw water distribution system before distribution within the stack.

9. The evaporator of claim 2, wherein each of the first tank, raw water evaporator, raw water distribution system and concentrated raw water collection system are operatively configured to any one or a combination of a skid and trailer for delivery to a job site.

10. The evaporator of claim 1, wherein the hot gas source is engine exhaust from an adjacent engine having an exhaust gas temperature in a range of 300° C. to 1,500° C. and the raw water evaporator includes insulated piping having a first end operatively connected to the flue and a second end for operative connection to the adjacent engine and where backpressure on the adjacent engine is controlled to 1-2 cm water column.

11. The evaporator of claim 7, wherein the flue has a heat deflection system to radially deflect direct heat from the hot gas source upon entry into the stack.

12. The evaporator of claim 1 further comprising an inner liner within the stack wherein the inner liner is dimensioned to define a fluid reservoir between the stack and inner liner for collecting and receiving downwardly flowing raw water for providing insulation and cooling to a lower position of the stack.

13. The evaporator of claim 1, wherein the control system includes at least one thermocouple for monitoring the temperature within the stack.

14. The evaporator of claim 1, further comprising a second stack adapted for configuration to an alternate hot gas source.

15. The evaporator of claim 1, wherein the hot combustion gas is waste heat from a diesel engine and the raw water evaporator simultaneously vaporizes water and removes particulate, soot and combustion chemicals from the hot combustion gas.

16. The evaporator as in claim 1 where the control system and pump maintains a feed rate of raw water to the stack of 20% or more above a desired vaporization rate as determined by the Btu input of the combustion gas.

17. A method of vaporizing raw water from oilfield operations and concentrating contaminants within raw water where the raw water contains oil, salt and particulate contaminants comprising the steps of:
    providing heat in the form of hot gases to a stack operatively connected to a flue where the hot gas is a combustion gas and the stack vaporizes and vents vaporized water to the atmosphere;
    distributing raw water within the hot combustion gases within the stack by a surface area generating technique and where the stack receives hot combustion gas at a temperature in a range of 300° C. to 1,500° C. from the flue;
    causing the raw water to come into direct contact with the hot gasses within the stack;
    monitoring at least one temperature within the stack;
    controlling the flow of raw water within the stack, as a function of the amount of heat within the hot gas while maintaining continuous raw water flow sufficient to minimize scaling within the stack during operation; and,
    collecting concentrated raw water from the stack within a holding tank and recirculating concentrated raw water from the holding tank to the stack.

18. The method of claim 17, wherein the raw water is allowed to at least partially stratify within the holding tank prior to distribution within the stack.

19. The method of claim 18, wherein the raw water has a liquid surface within the holding tank and the raw water distributed within the stack is drawn from a depth below the liquid surface.

20. The method of claim 17, wherein any one or a combination of spray nozzles, atomizing nozzles or packing material is used to generate raw water surface area within the stack.

21. The method of claim 17, further comprising the step of pre- heating the raw water by placing the concentrated raw water from the stack in heat exchange contact with the raw water from the holding tank prior to distributing the raw water in the stack.

22. The method of claim 17, wherein the hot gas is engine exhaust from a diesel engine.

23. The method of claim 17, wherein the hot gas is engine exhaust from an adjacent diesel engine and the method includes the steps of: transporting the engine exhaust from the adjacent diesel engine to the flue through piping and/or insulated piping.

24. The method as in claim 17 where the hot gas is produced by a diesel burner operatively connected to the flue and where the diesel burner in combination with the control system evaporates approximately 1 cubic meter of water/day per 100,000 Btu/hr of heat capacity of the diesel burner.

25. The method as in claim 22 where the raw water contains alkaline additives and neutralizes combustion gas.

26. The method as in claim 22 where the engine exhaust is from an engine/generator system rated at greater than 500 kWh.

27. A method of simultaneously a) concentrating contaminants within raw water, where the raw water is from oilfield operations and contains oil, salt and particulate contaminants and b) removing soot, particulate and/or chemicals from flue gases and/or engine exhaust comprising the steps of:
    providing heat in the form of hot gas to a stack operatively connected to a flue where the hot gas is a combustion gas and the hot gas enters the stack at a temperature in a range of 300° C. to 1,500° C;
    distributing raw water within hot combustion gases within the stack by a surface area generating technique;
    causing the raw water to come into direct contact with the hot gasses;
    monitoring at least one temperature within the stack;
    controlling the flow of raw water within the stack, as a function of the amount of heat within the hot gas while maintaining raw water flow through the stack sufficient to minimize scaling within the stack during operation; and
    collecting concentrated raw water from the stack within a holding tank and recirculating raw water within the stack.

28. The method of claim 27, wherein the raw water within the holding tank is allowed to at least partially stratify prior to distribution within the stack.

29. The method of claim 28, wherein the raw water has a liquid surface within the holding tank and the raw water distributed within the stack is drawn from a depth below the liquid surface of the holding tank.

30. The method of claim 27, wherein any one of or a combination of spray nozzles, atomizing nozzles and packing material is used to generate raw water surface area within the stack.

31. The method of claim 27, further comprising the step of pre-heating the raw water by placing the concentrated raw water from the stack in heat exchange contact with the raw water from the holding tank prior to distributing the raw water within the stack.

32. The method of claim 27, wherein the hot gas is engine exhaust from a diesel engine.

33. The method of claim 27, wherein the hot gas is engine exhaust from an adjacent diesel engine and the method includes the steps of: transporting the engine exhaust from the adjacent diesel engine to the flue through piping and/or.

* * * * *